(12) United States Patent
Boddy

(10) Patent No.: US 7,080,914 B1
(45) Date of Patent: Jul. 25, 2006

(54) VEHICULAR MIRROR WITH ADJUSTABLE PIVOT CONNECTION

(75) Inventor: Ian Boddy, Ada, MI (US)

(73) Assignee: Magna Donnelly Mirrors North America L.L.C., Kentwood, MI (US)

( * ) Notice: Subject to any disclaimer, the term of this patent is extended or adjusted under 35 U.S.C. 154(b) by 7 days.

(21) Appl. No.: 10/708,386

(22) Filed: Feb. 27, 2004

Related U.S. Application Data

(60) Provisional application No. 60/319,978, filed on Feb. 27, 2003.

(51) Int. Cl.
*G02B 7/182* (2006.01)

(52) U.S. Cl. ..................................... 359/879

(58) Field of Classification Search ........ 359/871–876, 359/879–881
See application file for complete search history.

(56) References Cited

U.S. PATENT DOCUMENTS

| | | | |
|---|---|---|---|
| RE27,653 E | 5/1973 | Oskam | |
| 3,972,597 A | 8/1976 | Repay et al. | |
| 4,101,206 A | 7/1978 | Oskam et al. | |
| 4,202,603 A | 5/1980 | Miyauchi | |
| 4,324,454 A | 4/1982 | Kumai | |
| 4,403,829 A | 9/1983 | Thujiuchi et al. | |
| 4,482,211 A | 11/1984 | Fisher | |
| 4,502,759 A | 3/1985 | Herzog et al. | |
| 4,598,605 A | 7/1986 | Manzoni | |
| 4,740,068 A | 4/1988 | Fisher | |
| 4,815,837 A | 3/1989 | Kikuchi et al. | |
| 4,856,885 A | 8/1989 | Fimeri | |
| 4,881,418 A | 11/1989 | Fimeri | |
| 4,915,493 A | 4/1990 | Fisher et al. | |
| 5,165,081 A * | 11/1992 | Drumheller | 359/854 |
| 5,331,471 A | 7/1994 | Gilbert | |
| 5,355,255 A | 10/1994 | Assinder | |
| 5,436,769 A | 7/1995 | Gilbert et al. | |
| 5,467,230 A | 11/1995 | Boddy et al. | |
| 6,050,537 A | 4/2000 | Fimeri | |
| 6,142,639 A | 11/2000 | Jain et al. | |
| 6,224,220 B1 | 5/2001 | Duroux et al. | |
| 6,254,242 B1 | 7/2001 | Henion et al. | |
| 6,264,338 B1 | 7/2001 | McFarland et al. | |

* cited by examiner

Primary Examiner—Euncha P. Cherry
(74) Attorney, Agent, or Firm—McGarry Bair PC

(57) ABSTRACT

A rearview mirror for a motor vehicle comprises an internal frame supporting a reflective element and a motorized tilt actuator assembly for adjusting the reflective element about perpendicular axes. The reflective element is attached to the internal frame through a pivot connection. The position of the pivot connection on the internal frame relative to the tilt actuator assembly can be selectively changed so that a single internal frame can be incorporated into mirrors of different sizes. Alternatively, the position of the tilt actuator assembly relative to the internal frame can be selectively changed.

10 Claims, 12 Drawing Sheets

VEHICULAR MIRROR WITH ADJUSTABLE PIVOT CONNECTION

CROSS-REFERENCE TO RELATED APPLICATION

This application claims the benefit of U.S. provisional application Ser. No. 60/319,978, filed Feb. 27, 2003, which is incorporated herein in its entirety.

FIELD OF THE INVENTION

The invention relates to mirrors for automotive vehicles. In one aspect, the invention relates to a tilt-adjustable rearview mirror comprising a reflective element mounting frame having a pivot connection which can be selectively positioned to accommodate mirrors of different sizes.

DESCRIPTION OF THE RELATED ART

Rearview mirrors are standard equipment on automotive vehicles, and can vary considerably in size depending upon the size of the vehicle to which the mirror is attached. Rearview mirrors typically comprise an internal frame which supports a reflective element, a tilt actuator, and other mirror components. The internal frame is typically attached at one end to the vehicle, to cantilever outwardly from the vehicle. A motorized tilt actuator is frequently used to adjust the tilt of the reflective element about horizontal and vertical axes. This tilt adjustment is facilitated by attaching the reflective element to the frame through a pivot connection, such as a ball and socket assembly. The ball portion is rigidly attached thereto.

Rearview mirrors of different sizes are typically constructed with frames of different sizes appropriate to the size of the mirror. Thus, numerous frames must be available for the construction of different sized mirrors. A single frame suitable for use in mirrors of different sizes has not been feasible because of the fixed location of the ball portion and the resulting fixed location of the actuators. The location of the ball portion may be appropriate for one size of mirror but not another.

SUMMARY OF THE INVENTION

In one aspect, the invention relates to a vehicular mirror assembly for providing an occupant of a vehicle with a rearward view, the mirror assembly comprising: a reflective element having a first connecting element; a frame for supporting the reflective element having a second connecting element, the first and second connecting elements being adapted to be interconnected to one another to mount the reflective element to the frame; at least one of the first connecting element and the second connecting element being movably mounted to a respective one of the reflective element and the frame so that one of the frame and the reflective element can be employed with differently-sized corresponding ones of other reflective elements and frames.

In another aspect, the invention relates to a vehicular mirror assembly having a reflective element for providing an occupant of a vehicle with a rearward view and an actuator assembly having at least one moveable jackscrew for adjusting the tilt of the reflective element, the mirror assembly comprising: a frame supporting the actuator assembly; one of a ball and socket attached to the reflective element; and the other of a ball and socket attached to the frame to form a pivotable connection with the one of a ball and socket for connecting the reflective element to the frame. The at least one jackscrew is thereby attached to the reflective element for connecting the reflective element to the actuator assembly. A first reflective element can be attached to the frame by selectively moving the one of the ball and socket along the frame to a first position in order to engage the other of the ball and socket. A second reflective element can thereby be attached to the frame by selectively moving the one of the ball and socket along the frame to a second position in order to engage the other of the ball and socket, thereby enabling the frame to be alternatively attached to reflective elements having the other of the ball and socket in alternatively different locations.

In another aspect, the invention relates to a vehicular mirror assembly comprising: a mirror housing having a pivot; a reflective element pivotably mounted within the housing on the pivot; wherein the pivot is repositionable with respect to the housing so that reflective elements of varying sizes can be mounted within the housing.

Various embodiments of the invention are also contemplated. The at least one first connecting element can comprise one of a ball and socket. The at least one second connecting element can comprise the other of a ball and socket. The frame can further comprise a slot, the at least one second connecting element can further comprise a plate, and the plate is slidably received in the slot.

An actuator assembly can be provided which has at least one moveable jackscrew for adjusting the tilt of the reflective element, wherein the at least one first connecting element is attached to the actuator assembly. The at least one first connecting element can comprise two connecting elements. The connecting elements can comprise the jackscrews. The frame can further comprise a slot, the one of the ball and socket further comprises a plate, and the plate can be slidably received in the slot. The reflective element can further comprise a slot, and the at least one moveable jackscrew can be slidably received in the slot.

One of the housing and the pivot can have a detent, and the other of the housing and the pivot can have a slot, and the pivot is repositionable with respect to the housing by movement of the detent within the slot. The pivot can be slidably mounted to the mirror housing. At least one detent can be located between the pivot and the mirror housing wherein the pivot is retained in a particular mounted position with respect to the mirror housing by the detent.

DESCRIPTION OF THE PREFERRED EMBODIMENT

Figure 1:
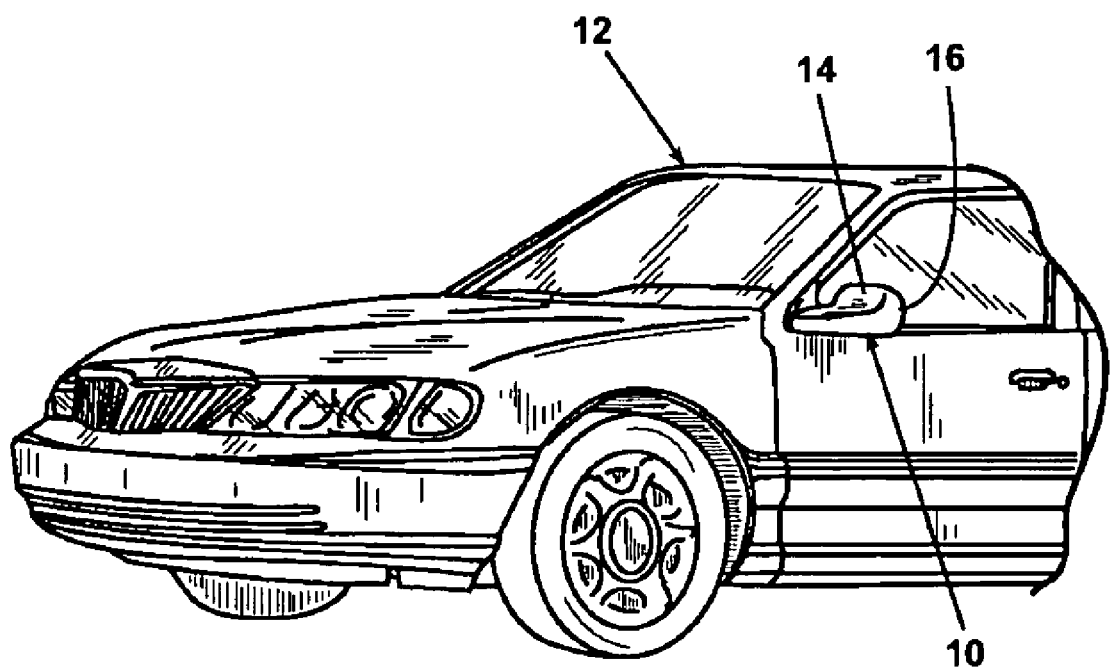
FIG. 1 is a perspective view of a portion of an automotive vehicle having a mirror assembly according to the invention.

As shown in FIG. 1, an embodiment of a rearview mirror assembly 10 according to the invention is installed on an automotive vehicle 12 on or near the front of the driver's side door. An identical mirror assembly can be similarly mounted to the vehicle 12 on the passenger's side. The description of the structure and operation of the mirror presented hereinafter will be equally applicable to both mirror assemblies. Although the invention is described herein with respect to an exemplary embodiment, the exemplary embodiments of the inventive concepts described herein are not to be considered as limiting, except where the claims expressly state otherwise.

Figure 2:
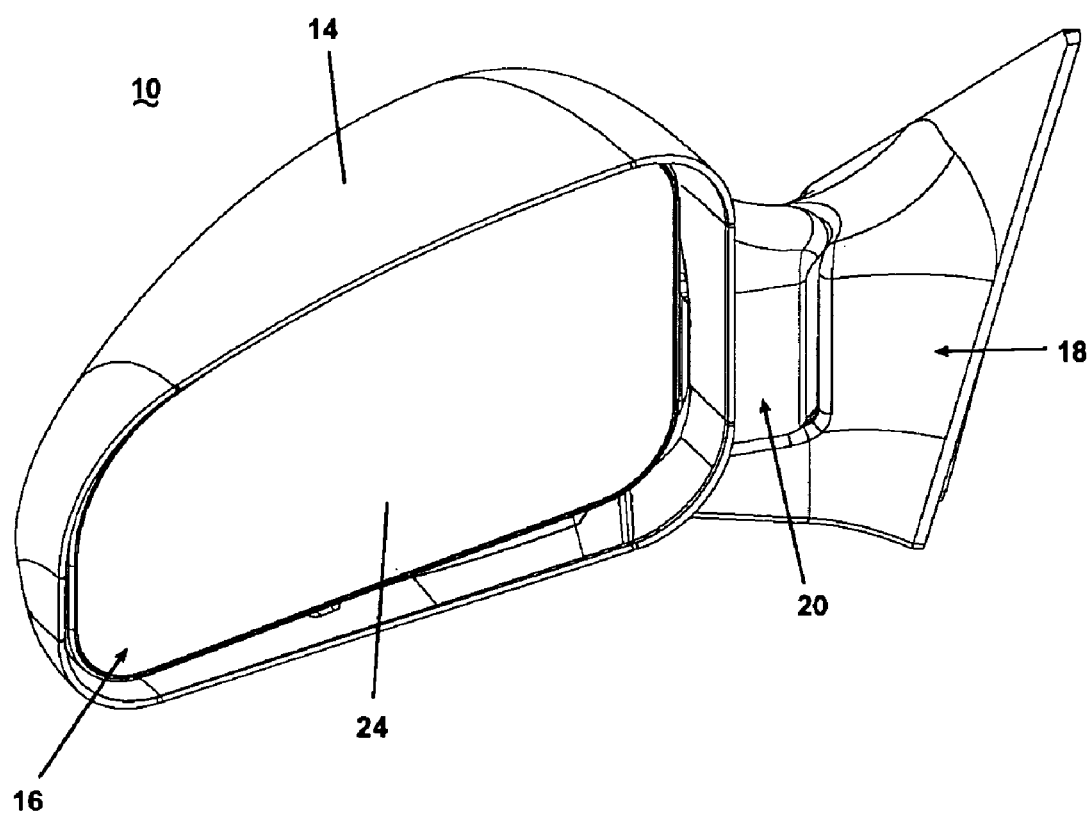
FIG. 2 is a close-up perspective view of the mirror assembly shown in FIG. 1 showing a reflective element assembly enclosed within a housing.
Figure 3:
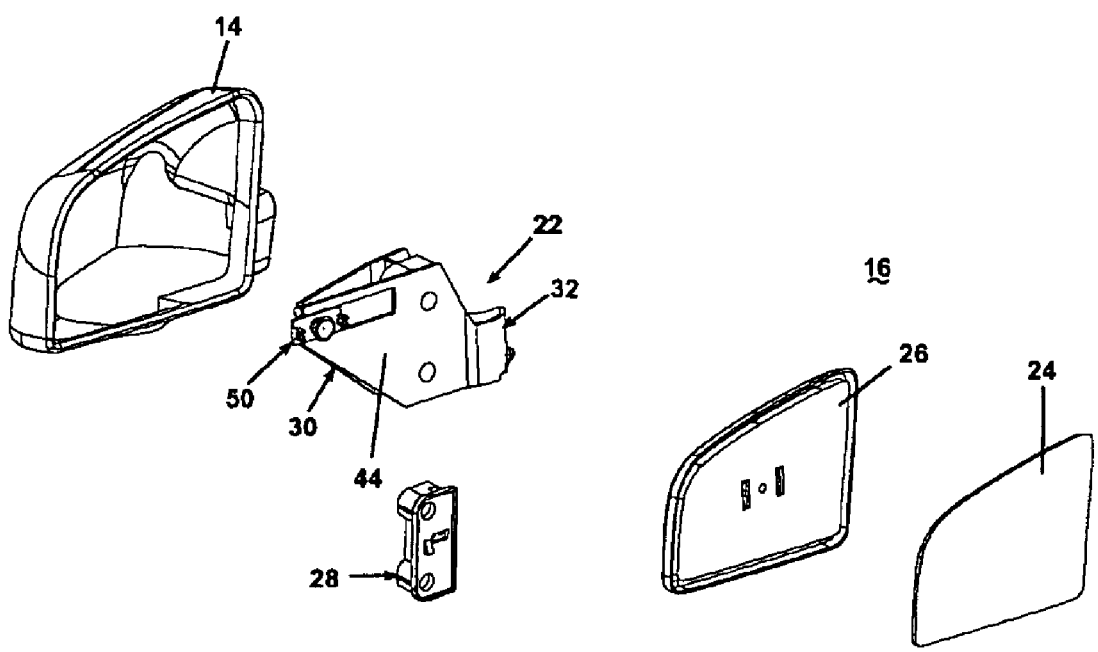
FIG. 3 is an exploded view of an embodiment of the mirror assembly shown in FIG. 1, the mirror assembly including an internal frame comprising an adjustable pivot connection according to the invention.

As shown also in FIGS. 2 and 3, the rearview mirror assembly 10 comprises a housing 14, a reflective element assembly 16 comprising a reflective element 24 and a glass case 26, a base assembly 18, a pivot assembly 20, an internal frame 22, and a tilt actuator assembly 28, which assembly 10 is mounted to the vehicle 12 in a generally conventional manner, and is operably connected to a remote control pad (not shown) inside the vehicle through a control cable or wire harness (not shown). An example of such a rearview mirror assembly and tilt actuator assembly, and the selected tilting of the reflective element assembly thereby, is shown and described in U.S. Patent Application Ser. No. 60/319,411, filed Jul. 19, 2002, entitled "Single-Motor Actuator With Selectable Multiple-Output Axes And Vehicle Mirror Incorporating Same," which is incorporated herein by reference.

The internal frame 22 pivotably supports the reflective element assembly 16 and is pivotably attached to the base assembly 18 through the pivot assembly 20 for pivotal movement of the internal frame 22 and the reflective element assembly 16 relative to the base assembly 18, and folding of the mirror assembly 10 inward adjacent the side of the vehicle 12. As shown in FIG. 3, the reflective element 24 is attached in a generally conventional manner to a glass case 26, which is in turn operably connected to a tilt actuator assembly 28 mounted in the internal frame 22. The tilt actuator assembly 28 is operably connected to the glass case 26 for adjustment of the vertical and horizontal tilt of the reflective element 24 in a well-known manner. A basic embodiment of the mounting between the tilt actuator assembly 28 and the glass case 26 is shown and described in U.S. Pat. No. 4,740,068, issued Apr. 26, 1988, which is incorporated herein by reference. The glass case 26 is also pivotably connected to the internal frame 22 through a pivot connection, such as a well-known ball and socket assembly.

Figure 4:
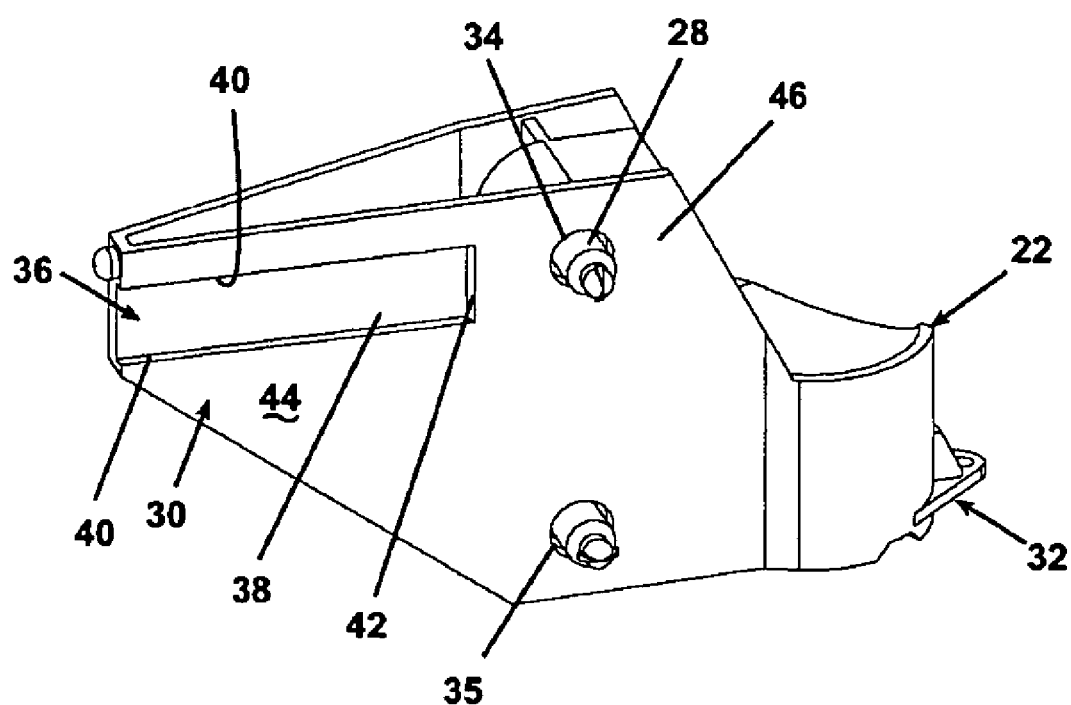
FIG. 4 is a close-up perspective view of the internal frame shown in FIG. 3 comprising a pivot bracket channel.

Referring now to FIG. 4, the internal frame 22 comprises an elongated, irregularly-shaped structure having a mounting end 30 and a pivot end 32. In the preferred embodiment, the internal frame 22 is fabricated of a rigid, high-strength thermoplastic. The internal frame 22 comprises a planar rear wall 46 having a flat exterior frame face 44. The internal frame 22 shown in FIG. 4 comprises an internal compartment (not shown) for receipt of the tilt actuator assembly 28. The internal compartment is comprised partly of the rear wall 46, which has an upper tilt actuator aperture 34 and a lower tilt actuator aperture 35 extending therethrough for insertion of the tilt actuator 28 from within the compartment for pivotable connection with the class case 26.

A pivot bracket channel 36 is an elongated, slot-like depression extending inwardly from the frame face 44 and comprising an inner wall 38 spaced from and parallel to the frame face 44. A pair of parallel, spaced-apart side walls 40 and an end wall 42 extend orthogonally from the frame face 44 and the inner wall 38 to form the perimeter of the pivot bracket channel 36. The pivot bracket channel 36 extends from the mounting end 30 toward the upper tilt actuator aperture 34 so that the longitudinal axis of the pivot bracket channel 36 is collinear with a diameter of the upper tilt actuator aperture 34. The pivot bracket channel 36 is adapted for slidable receipt of a detent, as described hereinafter.

Figure 5:
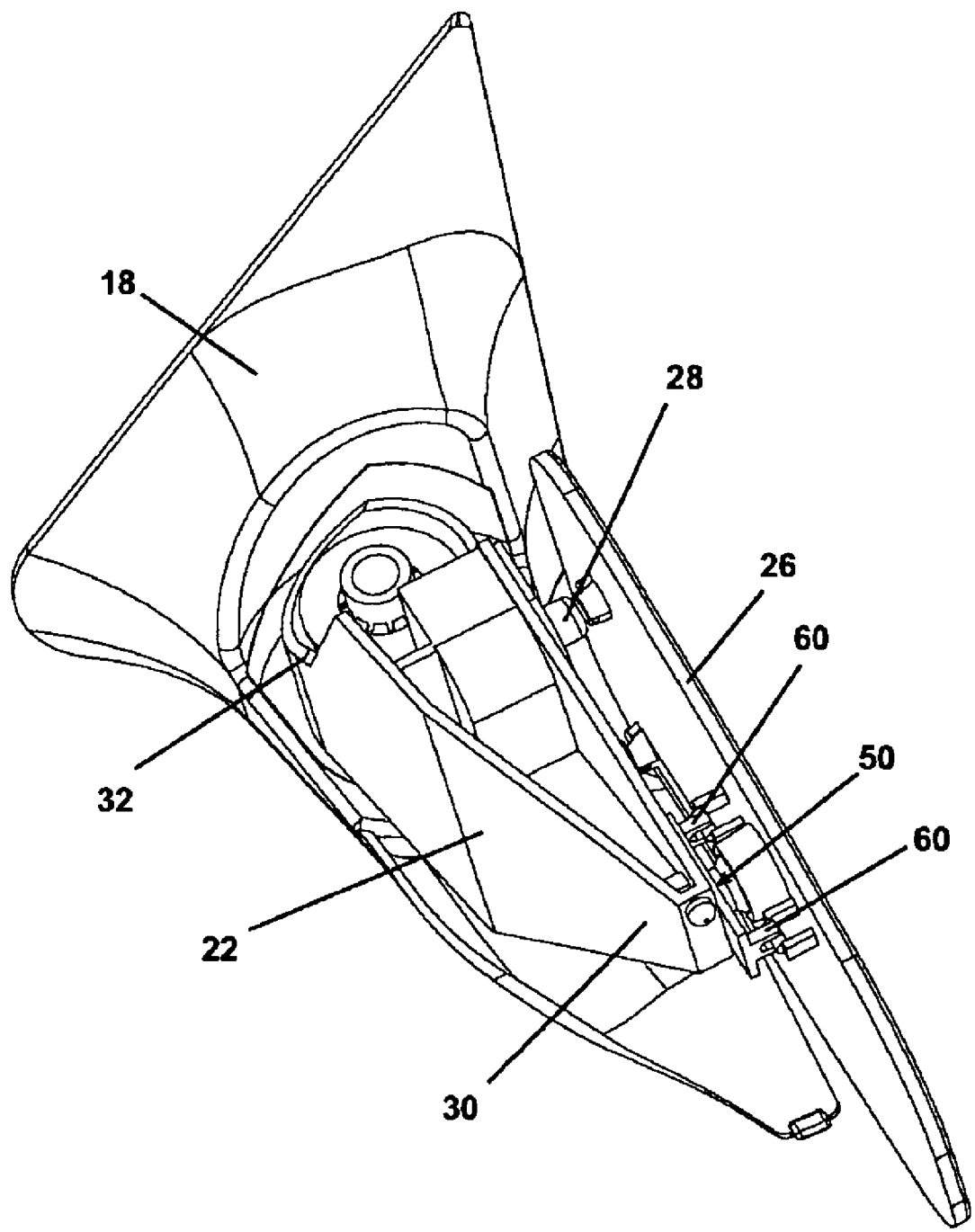
FIG. 5 is a perspective view of the reflective element assembly connected to the internal frame through the adjustable pivot connection comprising a pivot bracket shown in FIG. 3.
Figure 6:
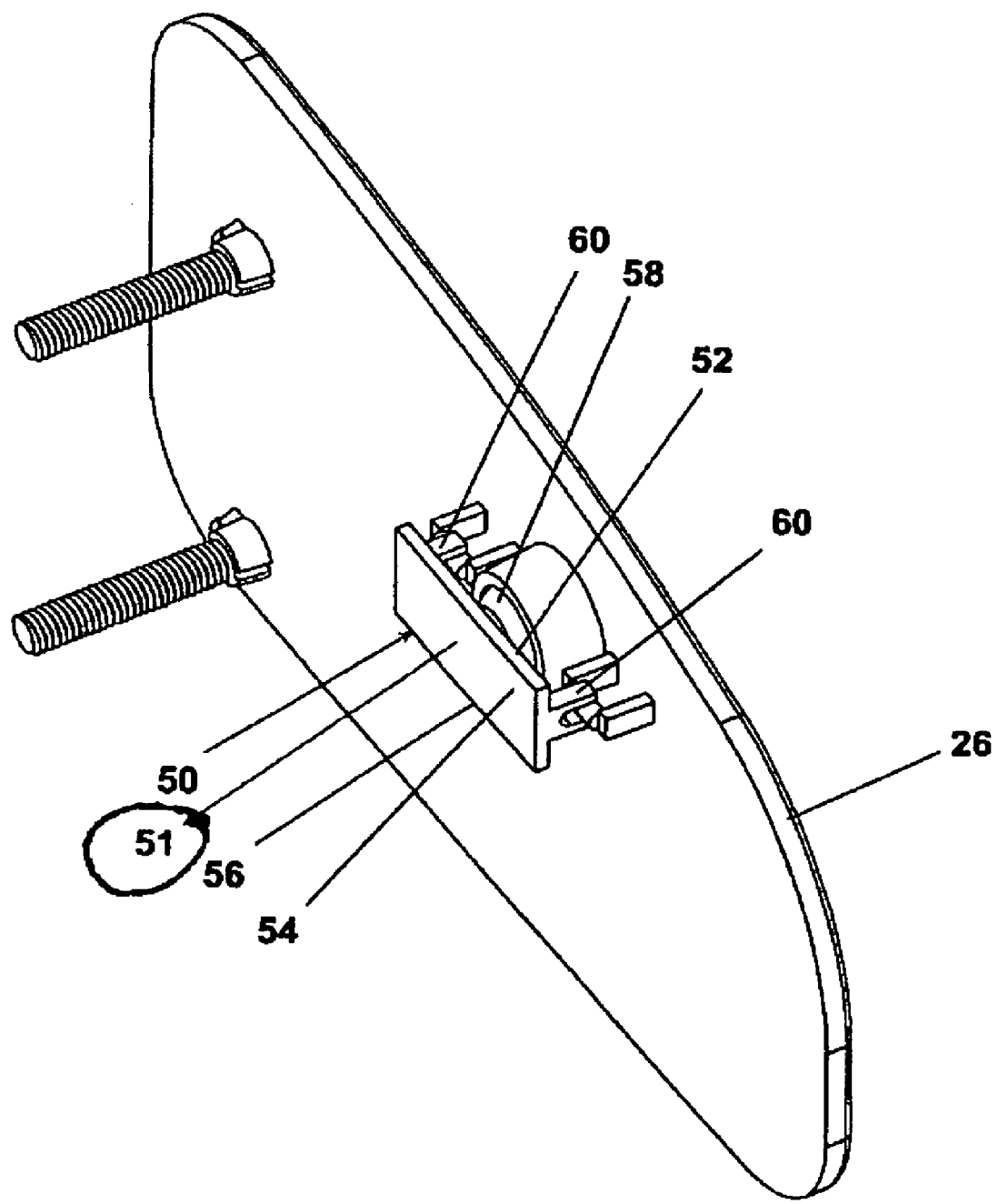
FIG. 6 is a close-up perspective view of the adjustable pivot connection shown in FIG. 5.

Referring also to FIGS. 5 and 6, a pivot bracket 50 is a somewhat U-shaped body comprising a detent illustrated for example as a rectilinear bracket plate 51 and a pair of parallel, spaced-apart stirrups 60. The bracket plate 51 comprises a mirror side 52 and a frame side 54. The frame side 54 comprises a plate surface 56. The stirrups 60 extend orthogonally from the mirror side 52 at opposite ends of the bracket plate 51. A pivot ball 58 extends orthogonally from the center of the mirror side 52 intermediate the stirrups 60 to operably engage the glass case 26 in a well-known manner. The stirrups 60 operably engage the glass case 26 in a well-known configuration to enable pivoting of the glass case 26 about the pivot ball 58 while steadying the glass case 26 against misalignment and vibration. Preferably, the pivot bracket 50 is fabricated of a rigid, high-strength thermoplastic.

Figure 7:
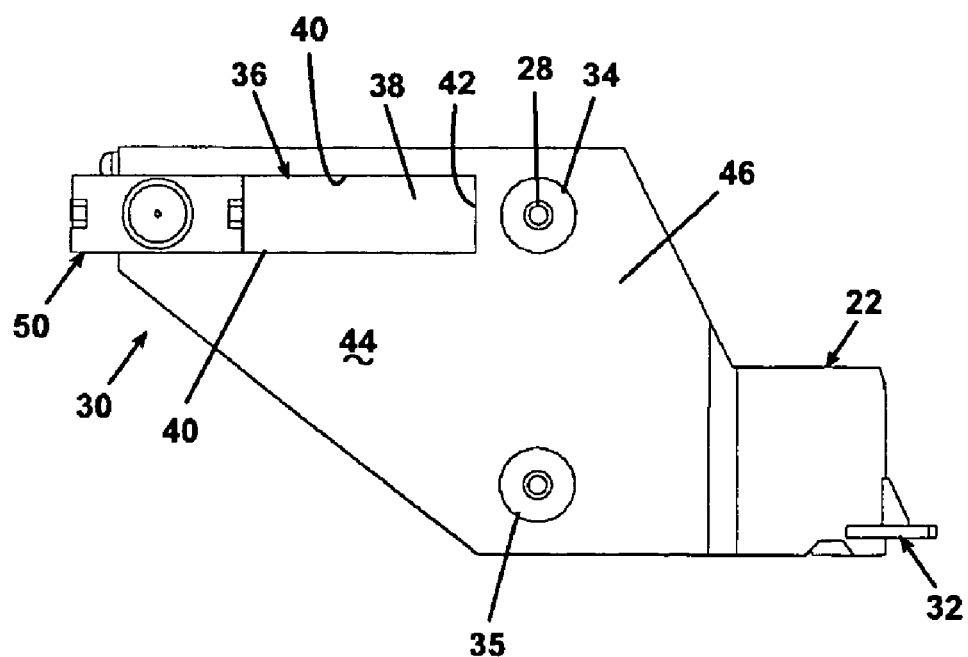
FIG. 7 is a front elevational view of the internal frame and pivot bracket shown in FIG. 3 configured for a large rearview mirror.
Figure 8:
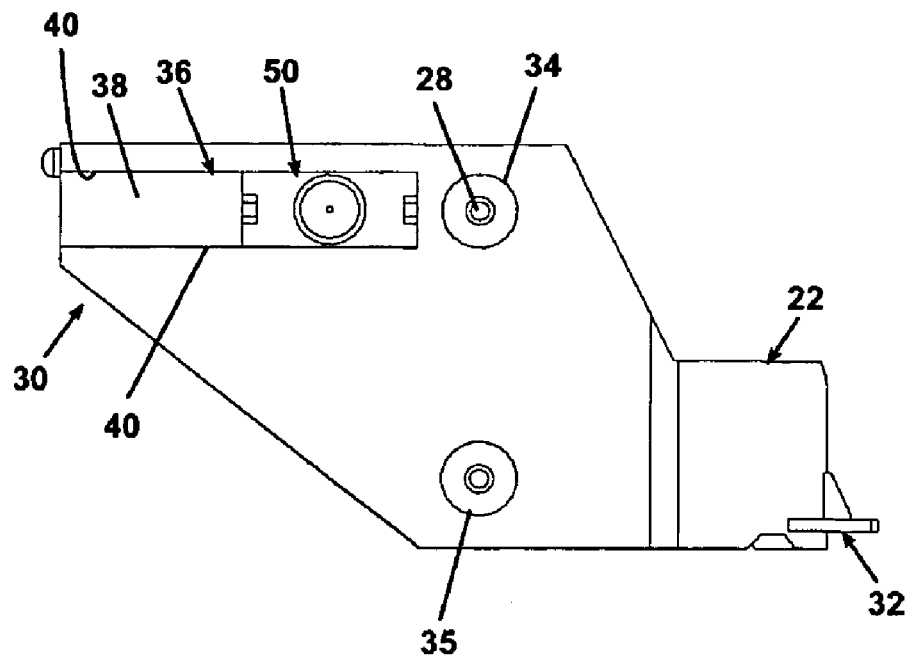
FIG. 8 is a front elevational view of the internal frame and pivot bracket shown in FIG. 3 configured for a small rearview mirror.

As shown in FIGS. 7 and 8, the pivot bracket 50 is adapted for slidable insertion in the pivot bracket channel 36 and selective positioning of the pivot bracket 50 along the pivot bracket channel 36. The pivot bracket 50 can be adapted to be held in a selected position in the pivot bracket channel 36, such as by a ratchet mechanism, an interference fit, fasteners, detents, an adhesive, welding, or other suitable attachment. As shown in FIG. 7, the pivot bracket 50 can be positioned at the mounting end 30 of the internal frame 22 for large mirrors. As shown in FIG. 8, the pivot bracket 50 can be positioned adjacent the upper tilt actuator aperture 34 for small mirrors. Similarly, the pivot bracket 50 can be placed at an intermediate position for mid-sized mirrors. As can be seen, an appropriate axial alignment is maintained between the tilt actuators and the pivot.

Figure 8A:
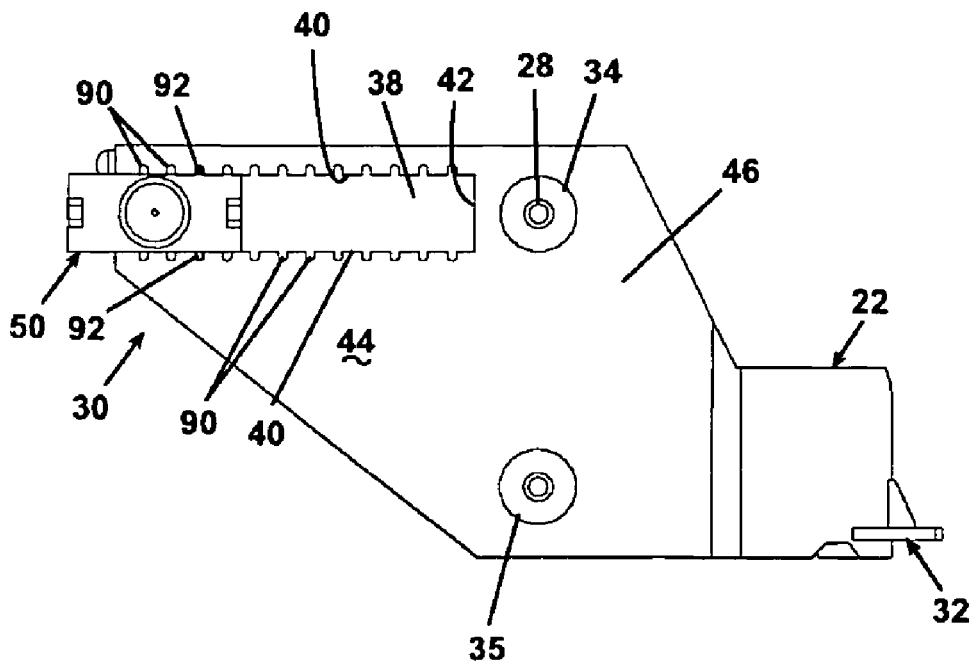
FIG. 8A is a front elevational view of the internal frame and a first alternate embodiment of the pivot bracket.
Figure 8B:
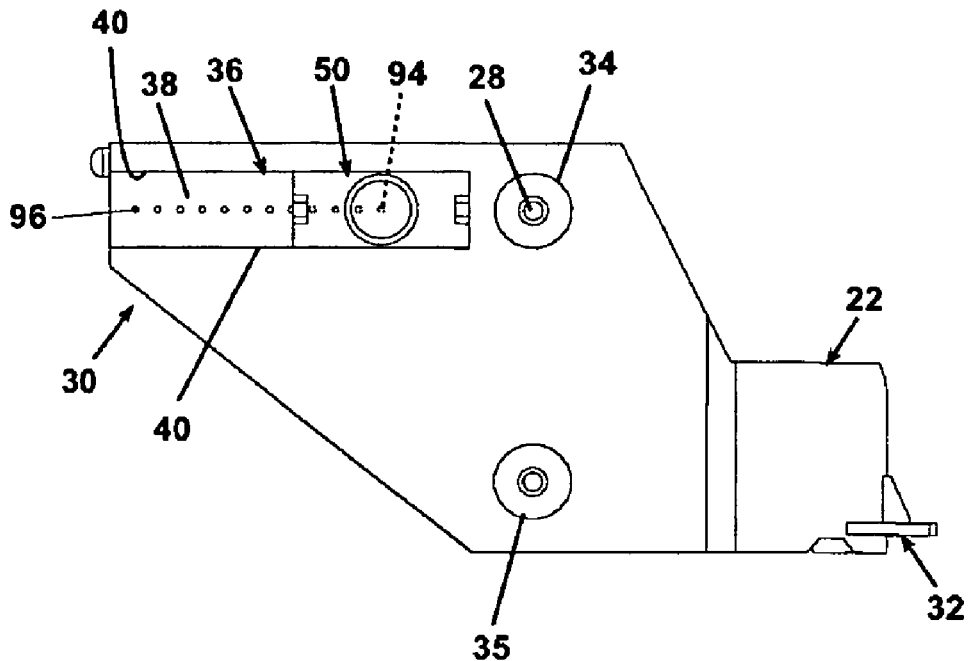
FIG. 8B is a front elevational view of the internal frame and a second alternate embodiment of the pivot bracket.
Figure 8C:
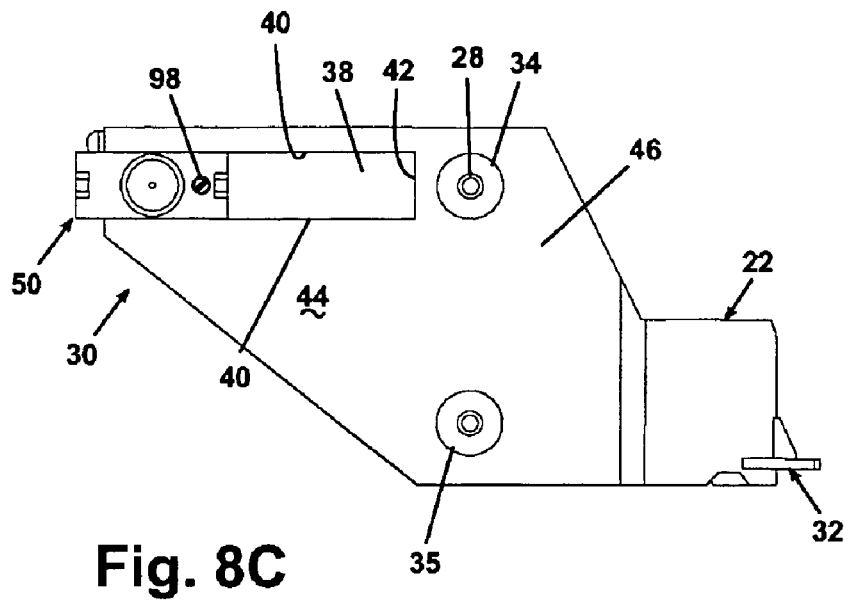
FIG. 8C is a front elevational view of the internal frame and a third alternate embodiment of the pivot bracket.
Figure 8E:
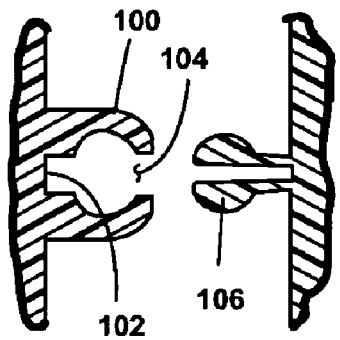
FIG. 8E is a cross-sectional view taken along line 8E—8E of FIG. 8D.
Figure 8D:
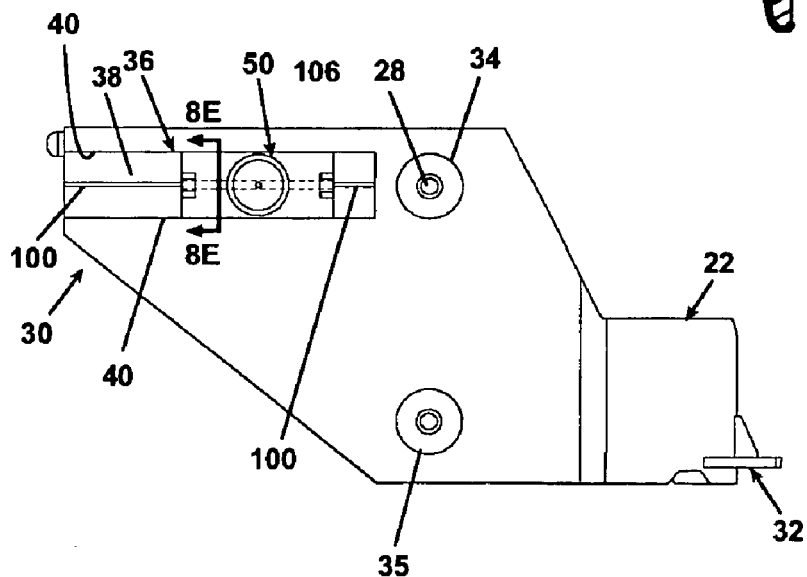
FIG. 8D is a front elevational view of the internal frame and a fourth alternate embodiment of the pivot bracket.

With reference to FIGS. 6–8, the pivot bracket 50 can be retained in a selected position by adapting the pivot bracket 50 and the pivot bracket channel 36 for an interference fit of the bracket plate 51 in the pivot bracket channel 36, as shown in FIGS. 7 and 8. Alternately, the pivot bracket plate 51 can be prevented from movement by a pair of bosses 90 extending laterally outwardly therefrom to engage a plurality of detents 92 in the side walls 40 of the pivot bracket channel 36, as shown in FIG. 8A. As shown in FIG. 8B, the pivot bracket plate 51 can alternately be provided with a boss 94 extending orthogonally outwardly from the frame side 54 to engage a plurality of longitudinally-aligned detents 96 in the inner wall 38. In yet another alternative, shown in FIG. 8C, the pivot bracket plate 51 can be provided with a setscrew 98 which can be tightened against the inner wall 38 to retain the pivot bracket 50 in place. Alternately, the pivot bracket 50 can be provided with one or more screws (not shown) which are threaded through the bracket plate 51 into longitudinally-aligned screw holes in the inner wall 38. As shown in FIGS. 8D and 8E, in yet another alternate embodiment, the pivot bracket channel 36 can be provided with a raised rail 100 having a longitudinal channel 102 and a longitudinal slot 104 adapted to slidably receive a split pin 106 extending orthogonally outwardly from the frame side 54 of the bracket plate 51. The split pin 106 is adapted so that the pin halves exert a lateral force against the longitudinal channel 102 to prevent the movement of the pivot bracket 50 while enabling the split pin 106 to slide in the channel 102 for repositioning. Alternately, the longitudinal channel 102 and the longitudinal slot 104 can be adapted to extend below the inner wall 38, thereby eliminating the raised rail 100. Finally, the pivot bracket 50 can be adapted to freely translate along the pivot bracket channel 36 without additional movement-restricting devices as described herein since the position of the pivot bracket 50 with respect to the tilt actuator assembly 28 will be fixed by the receptacles provided on the glass case 26 for attaching the tilt actuator assembly 28 and the pivot ball 58 to the glass case 26.

Figure 9:
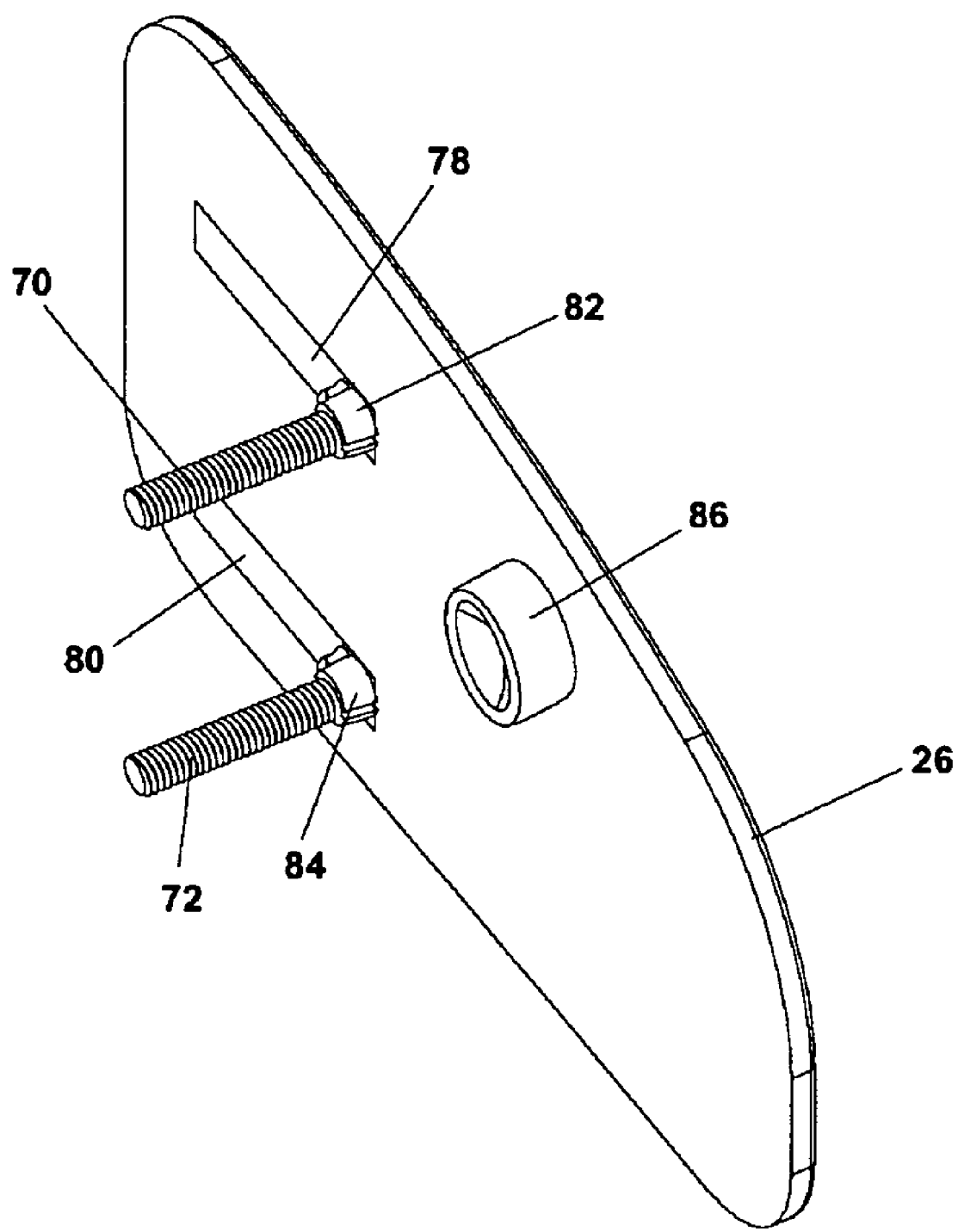
FIG. 9 is a perspective view of a second embodiment of the adjustable pivot connection wherein tilt actuator jackscrews are adjustably positioned for attachment to different sized mirrors.
Figure 10:
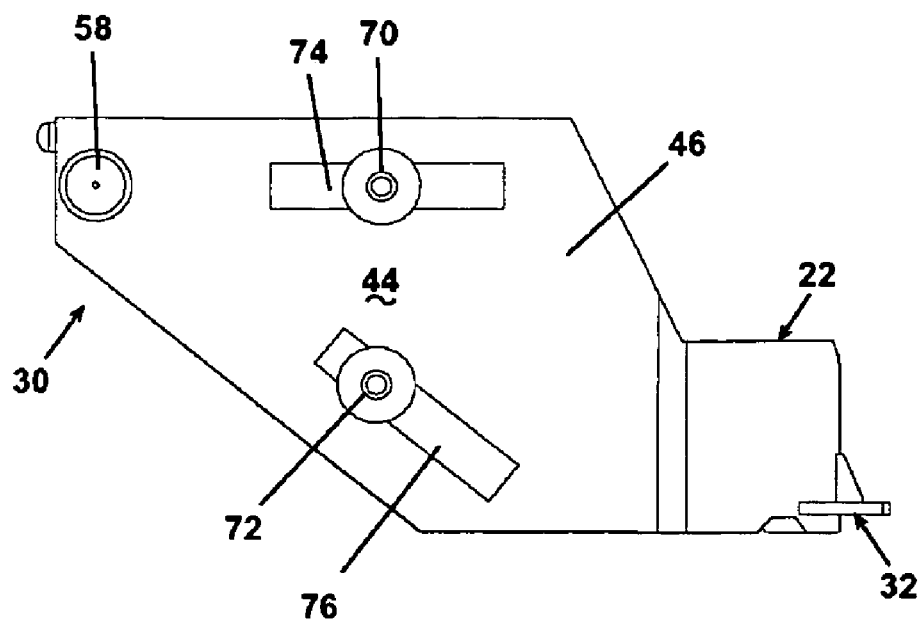
FIG. 10 is a front elevational view of the internal frame and jackscrew connectors shown in FIG. 9 configured for a first rearview mirror.
Figure 11:
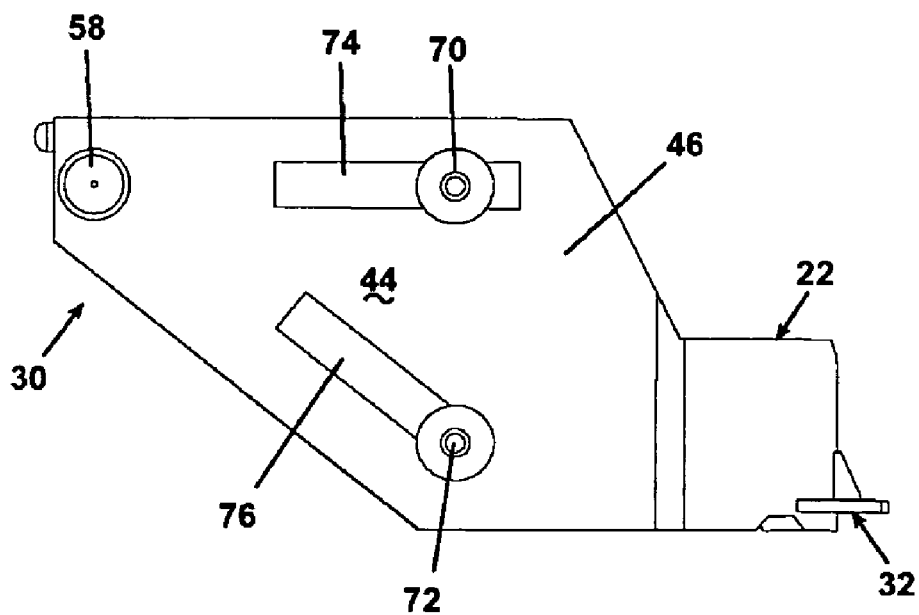
FIG. 11 is a front elevational view of the internal frame and jackscrew connectors shown in FIG. 9 configured for a second rearview mirror having a size different from the first rearview mirror.

FIGS. 9–11 show an alternate embodiment in which a pair of tilt jackscrews 70, 72 are moveably connected to the glass case 26 through an upper slot 74 and an inclined slot 76, respectively, and the pivot ball 58 is rigidly attached to the pivot end 32 of the internal frame 22 for pivotable connection to a pivot ball socket 86 on the glass case 26. The glass case 26 can be provided with fixed jackscrews sockets 82, 84 whose position relative to the pivot ball socket 86 varies with the size of the glass case 26 (FIG. 9). Alternatively, the glass case 26 can be provided with mating slots (not shown) in which the jackscrew sockets 82, 84 are slidably mounted. The position of the actuator and the tilt jackscrews 70, 72 can be adjusted according to the size of the reflective element assembly 16, as shown in FIGS. 10 and 11, while maintaining the perpendicular axial alignment of the tilt actuator jackscrews 70, 72. The illustrated embodiment may necessitate the use of different tilt actuator assemblies having different jackscrew spacings in order to accommodate the change in spacing implicated by the relative inclination of the slots 74, 76. The embodiment shown in FIGS. 9–11 enables the distance between the jackscrews 70, 72 and the pivot ball 58 to be readily maximized, thereby optimizing the stability of the glass case 26, which increases as the distance between the jackscrews 70, 72 and the pivot ball 58 increases.

Figure 12:
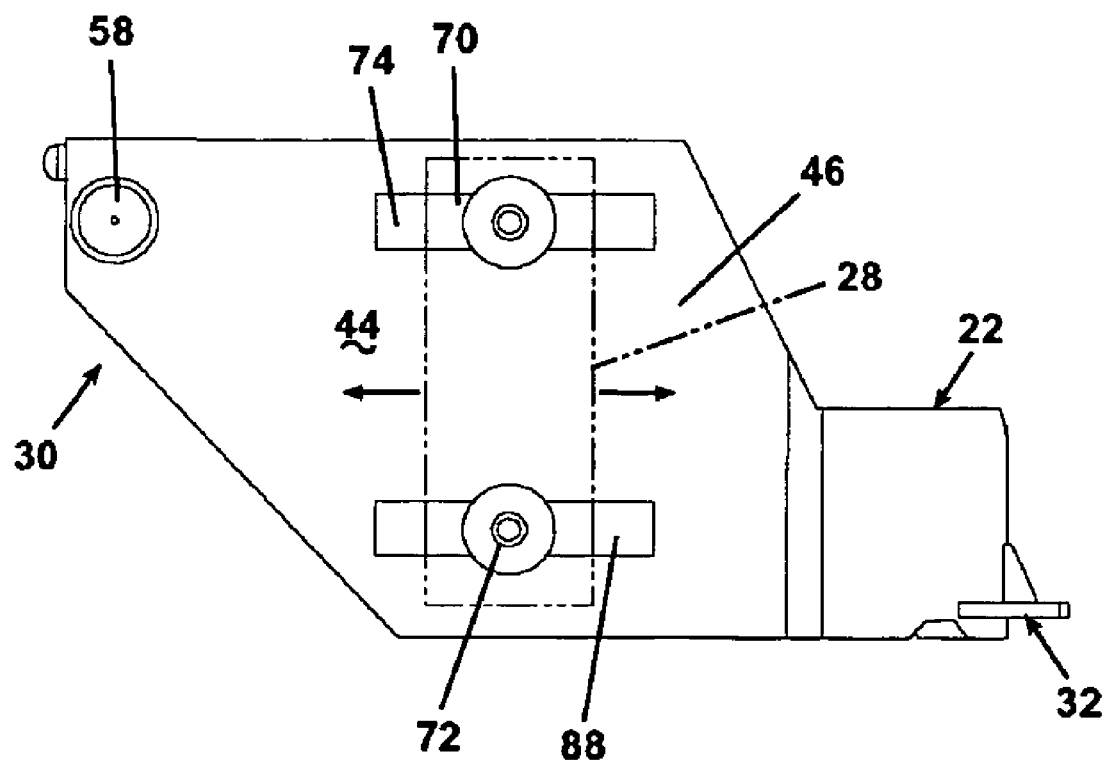
FIG. 12 is a front elevational view of a third embodiment of the adjustable pivot connection wherein tilt actuator jackscrews are adjustably positioned for attachment to different sized mirrors.
Figure 6:
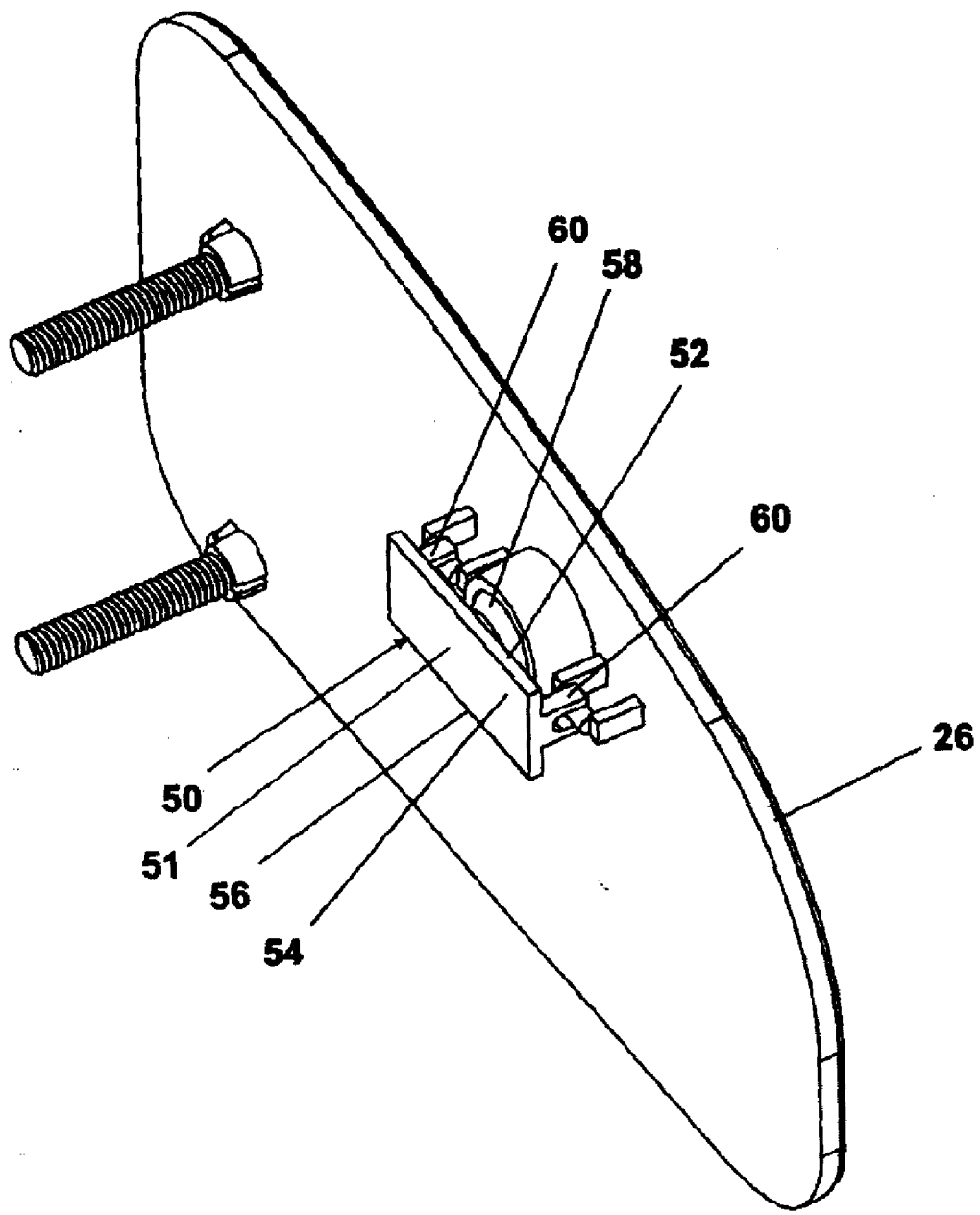

FIG. 12 shows an alternate embodiment similar to that shown in FIGS. 9–11 in which the inclined slot 76 is replaced with a lower slot 88 which is parallel to the upper slot 74. This configuration enables the use of a single tilt actuator assembly 28 having a fixed jackscrew spacing which can be positioned relative to the pivot ball 58 to accommodate different sized mirror assemblies.

The adjustable pivot connection is easy to assemble and enables a single internal frame configuration to be utilized in mirrors of different sizes, thereby eliminating the need for a multiplicity of internal frames specific to each different mirror size.

While the invention has been specifically described in connection with certain specific embodiments thereof, it is to be understood that this is by way of illustration and not of limitation. Reasonable variation and modification are possible within the scope of the foregoing disclosure and drawings without departing from the scope of the invention.

The invention claimed is:

1. A vehicular mirror assembly for providing an occupant of a vehicle with a rearward view, the mirror assembly comprising:
    a reflective element having a first pivot element and a first actuator element;
    a frame for supporting the reflective element having a second pivot element and a second actuator element, the first and second pivot elements being adapted to be interconnected to one another to tiltably mount the reflective element to the frame and the first and second actuator elements being adapted to be interconnected to one another whereby actuation of the second actuator element causes the reflective element to tilt with respect to the frame;
    at least one of the first pivot element, the second pivot element, the first actuator element and the second actuator element being movably mounted to a respective one of the reflective element and the frame so that one of the frame and the reflective element is employed with differently-sized corresponding ones of other reflective elements and frames.

2. A vehicular mirror assembly according to claim 1, wherein the at least one first pivot element comprises one of a ball and socket.

3. A vehicular mirror assembly according to claim 2, wherein the at least one second pivot element comprises the other of a ball and socket.

4. A vehicular mirror assembly according to claim 1, wherein the frame further comprises a slot, the at least one second pivot element further comprises a plate, and the plate is slidably received in the slot so that it is movable between a plurality of positions to alter the distance between the interconnected first and second pivot elements and the interconnected first and second actuator elements.

5. A vehicular mirror assembly according to claim 1, wherein the second actuator element comprises an actuator assembly having at least one moveable jackscrew for adjusting the tilt of the reflective element, wherein the at least one first actuator element is attached to the actuator assembly.

6. A vehicular mirror assembly according to claim 5, wherein the at least one second actuator element comprises two second actuator elements.

7. A vehicular mirror assembly according to claim 6, wherein the two second actuator elements comprise the jackscrews.

8. A vehicular mirror assembly having a reflective element for providing an occupant of a vehicle with a rearward view and an actuator assembly having at least one moveable jackscrew for adjusting the tilt of the reflective element, the mirror assembly comprising:
- a frame supporting the actuator assembly;
- one of a ball and socket attached to the reflective element;
- the other of a ball and socket attached to the frame to form a pivotable connection with the one of a ball and socket for connecting the reflective element to the frame; and
- the at least one jackscrew is attached to the reflective element at a location spaced from the one of the ball and socket for connecting the reflective element to the actuator assembly, wherein actuation of the jackscrew assembly causes the reflective element to tilt relative to the frame;
- wherein a first reflective element is attached to the frame by selectively moving the one of the ball and socket along the frame to a first position in order to engage the other of the ball and socket; and
- wherein a second reflective element is attached to the frame, when the first reflective element is disconnected therefrom, by selectively moving the one of the ball and socket along the frame to a second position in order to engage the other of the ball and socket, thereby enabling the frame to be alternatively attached to reflective elements having the other of the ball and socket in alternatively different locations.

9. A vehicular mirror assembly according to claim 8, wherein the frame further comprises a slot, the one of the ball and socket further comprises a plate, and the plate is slidably received in the slot.

10. A vehicular mirror assembly according to claim 8, wherein the reflective element further comprises a slot, and the at least one moveable jackscrew is slidably received in the slot.

* * * * *

UNITED STATES PATENT AND TRADEMARK OFFICE
CERTIFICATE OF CORRECTION

PATENT NO. : 7,080,914 B1
APPLICATION NO. : 10/708386
DATED : July 25, 2006
INVENTOR(S) : Ian Boddy It is certified that error appears in the above-identified patent and that said Letters Patent is hereby corrected as shown below:

Drawings
Replace sheet 6 of 12 with attached sheet.
Figure 6 is the "Annotated Sheet Showing Changes" instead of the "Replacement Sheet" submitted to the PTO on August 4, 2005, in response to an Office Action. A copy of the Replacement Sheet is included with the Certificate of Correction.

Signed and Sealed this

Twenty-fourth Day of October, 2006

JON W. DUDAS
*Director of the United States Patent and Trademark Office*